(12) United States Patent
Loi et al.

(10) Patent No.: US 12,229,720 B2
(45) Date of Patent: *Feb. 18, 2025

(54) CREATION AND ARRANGEMENT OF ITEMS IN AN ONLINE CONCIERGE SYSTEM-SPECIFIC PORTION OF A WAREHOUSE FOR ORDER FULFILLMENT

(71) Applicant: Maplebear Inc., San Francisco, CA (US)

(72) Inventors: Joey Loi, Brooklyn, NY (US); Viswa Mani Kiran Peddinti, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,860

(22) Filed: Nov. 30, 2023

(65) Prior Publication Data

US 2024/0095673 A1    Mar. 21, 2024

Related U.S. Application Data

(63) Continuation of application No. 17/726,422, filed on Apr. 21, 2022, now Pat. No. 11,868,961.

(51) Int. Cl.
*G06Q 10/00* (2023.01)
*G06Q 10/087* (2023.01)
*G06Q 30/06* (2023.01)

(52) U.S. Cl.
CPC .................................. *G06Q 10/087* (2013.01)

(58) Field of Classification Search
CPC ..................................................... G06Q 10/087
See application file for complete search history.

(56) References Cited

U.S. PATENT DOCUMENTS

| | | | |
|---|---|---|---|
| 8,620,707 B1 * | 12/2013 | Belyi ................... | G06Q 10/087 705/28 |
| 10,540,703 B2 * | 1/2020 | Deshpande ........ | G06Q 30/0639 |
| 2014/0032360 A1 * | 1/2014 | Nicholson ............. | G06T 19/006 705/26.7 |

(Continued)

OTHER PUBLICATIONS

PCT International Search Report and Written Opinion, PCT Application No. PCT/US2023/015801, Jun. 15, 2023, 12 pages.

*Primary Examiner* — Talia F Crawley
(74) *Attorney, Agent, or Firm* — Fenwick & West LLP

(57) ABSTRACT

A warehouse from which shoppers fulfill orders for an online concierge system maintains an online concierge system-specific portion for which the online concierge system specifies placement of items in regions. To place items in the online concierge system-specific portion, the online concierge system accounts for co-occurrences of different items in orders and measures of similarity between different items. From the co-occurrences of items, the online concierge system generates an affinity graph. The online concierge system also generates a colocation graph based on distances between different regions in the online concierge system-specific portion. Using an optimization function with the affinity graph and the colocation graph, the online concierge system selects regions within the online concierge system-specific portion for different items to minimize an amount of time for shoppers to obtain items in the online concierge-system specific portion.

20 Claims, 8 Drawing Sheets

(56) References Cited

U.S. PATENT DOCUMENTS

| | | | | |
|---|---|---|---|---|
| 2017/0330259 A1* | 11/2017 | Deshpande | ........ | G06Q 30/0639 |
| 2020/0250739 A1* | 8/2020 | Poole | ................ | G06Q 30/0639 |
| 2021/0166283 A1* | 6/2021 | Black | ................ | G06Q 30/0282 |
| 2022/0092681 A1* | 3/2022 | Haapoja | ................ | H04W 4/024 |
| 2022/0114640 A1* | 4/2022 | Pawar | ................ | G06Q 30/0282 |

* cited by examiner

CREATION AND ARRANGEMENT OF ITEMS IN AN ONLINE CONCIERGE SYSTEM-SPECIFIC PORTION OF A WAREHOUSE FOR ORDER FULFILLMENT

CROSS REFERENCE TO RELATED APPLICATIONS

This application is a continuation of co-pending U.S. application Ser. No. 17/726,422, filed Apr. 21, 2022, which is incorporated by reference in its entirety.

BACKGROUND

This disclosure relates generally to order fulfillment by an online concierge system and more specifically to creating and stocking items in an online concierge system-specific portion of a warehouse for order fulfillment by shoppers.

Conventional warehouses, such as retail stores, are configured to increase opportunities for a warehouse to obtain revenue from customers. For example, conventional warehouses arrange items to increase opportunities to browse through items offered by a warehouse when shopping, increasing likelihoods of customers purchasing more products when navigating through the warehouse. While such arrangement of physical items allows greater revenue opportunities for a warehouse, it often increases an amount of time for customers to find specific items in the warehouse. For a shopper fulfilling an order for an online concierge system, such an increased amount of time to find an item in a warehouse increases an overall amount of time for the shopper to obtain items for an order, which increases a likelihood of the shopper fulfilling the order later than a time specified by a user.

SUMMARY

To simplify retrieval of items for orders, the online concierge system and a warehouse establish an online concierge system-specific portion of the warehouse. The online concierge system provides the warehouse with instructions for arranging items within the online concierge system-specific portion of the warehouse. This allows the online concierge system to arrange items in the online concierge system-specific portion of the warehouse to reduce amounts of time for shoppers to obtain orders from the online concierge system-specific portion of the warehouse, decreasing fulfillment time for orders received by the online concierge system that identify the warehouse. This also helps shoppers find items in an order more easily, thereby increasing the findability or find rate of items that customers have ordered. In various embodiments, the online concierge system-specific portion of the warehouse comprises an aisle, or multiple aisles, within the warehouse.

In various embodiments, the online concierge system-specific portion of the warehouse is segmented into multiple regions by the online concierge system, with each region uniquely identified by a region identifier. For example, a region identifier includes an aisle identifier of an aisle within the online concierge system-specific portion of the warehouse, a row identifier specifying a row on the aisle corresponding to the aisle identifier, and a column identifier specifying a column of the aisle corresponding to the aisle identifier. However, in other embodiments, the online concierge system uses other information to identify different regions within the online concierge system-specific portion of the warehouse. The online concierge system identifies items to be placed in different regions and identifies one or more regions to a shopper fulfilling an order to simplify retrieval of items by the shopper.

To arrange items in regions within the online concierge system-specific portion of the warehouse, the online concierge system retrieves orders previously fulfilled by the online concierge system via the warehouse. From the previously fulfilled orders, the online concierge system generates an affinity graph comprising nodes that represent items offered by the warehouse and connections between the items represented by the nodes. In various embodiments, the online concierge system selects a set of candidate items and generates the affinity graph including the candidate items and connections between the candidate items. In some embodiments, the online concierge system selects the set of candidate items based on the top ordered items from historical information. In other embodiments the online concierge system selects the set of candidate items based on a prediction of the number of orders that will including the items. For example, the online concierge system applies a trained prediction model to items offered by a warehouse to determine a predicted number of orders that are likely to include each item.

The online concierge system determines an affinity score between a first item and a second item based on characteristics of the first and second items. For example, an affinity score between the first item and the second item is based on a co-occurrence score for the first item and the second item. The co-occurrence score between a first item and a second item is based on a number of previously fulfilled orders including the first item and the second item. In an example, the online concierge system determines the co-occurrence score between the first item and the second item by determining a number of previously fulfilled orders including both the first item and the second item and determining a sum of a number of items including the first item and a number of items including the second item. The co-occurrence score between the item and the additional item is determined by dividing the number of orders including both the first item and the second item by the sum. In some embodiments, the online concierge system determines the co-occurrence score between the first item and the second item by multiplying the number of previously fulfilled orders including both the first item and the second item by a constant (e.g., 2) and dividing the resulting product by a sum of a number of items including the first item and a number of items including the second item. In some embodiments, the affinity score between the first item and the second item is the co-occurrence score of the first item and the second item.

The affinity score between the first item and the second item may account for other characteristics between the first item and the second item in other embodiments. For example, the affinity score between two items may also be computed based on a measure of how dissimilar the two items are from each other. The measure of how dissimilar two items are may be inversely related to a similarity score for the two items, such that the affinity score between two items is higher when the similarity score between the two items is lower. In various embodiments, the online concierge system determines item embeddings for each item offered by a warehouse, and the measure of similarity between a first item and a second item is a measure of similarity between a first item embedding for the first item and a second item embedding for the second item. Example measures of similarity between item embeddings include a cosine similarity or a dot product between the item embeddings. In other embodiments, the online concierge system determines the measure of similarity between the first item and the second item based on a number of common attributes of the item and the additional item. The online concierge system may determine the affinity score between the first item and the second item by combining the co-occurrence score of the first item and the second item and the measure of similarity between the first item and the second item. The affinity score between the first item and the second item is stored as a weight of a connection between the first item and the second item when generating the affinity graph. In other embodiments, the online concierge system stores the co-occurrence score and the measure of similarity as weights of a connection between the first item and the second item when generating the affinity graph.

In some embodiments, the online concierge system generates clusters of items. In various embodiments, the online concierge system uses hierarchical clustering to generate the clusters of items. The online concierge system generates clusters so items included in a cluster have maximum affinity scores with each other. The online concierge system generates clusters of items based on distances between items, with clusters including items having less than a threshold distance between each other in the affinity graph or including items so distances between items in the cluster is minimized. To generate clusters, the online concierge system determines distances between pairs of items using a measure of similarity between the items of the pair and the co-occurrence score between the items of the pair. For example, the online concierge system determines a distance between a first item and a second item by dividing the measure of similarity between the first item and the second item by the affinity score of the first and second items. Using the determined distances between items, the online concierge system applies one or more clustering models to generate clusters. In various embodiments, using hierarchical clustering identifies a series of hierarchical groups for each item included in the affinity graph; hence, an item is associated with different clusters that correspond to different levels in a taxonomy. In various embodiments, different groups of the series correspond to different levels in a taxonomy maintained by the online concierge system.

While the affinity graph and the clusters of items allows the online concierge system to identify relationships between items and generate clusters of items with high co-occurrence scores and low measures of similarities, the online concierge system also generates a colocation graph describing a physical layout of the online concierge system-specific portion of the warehouse. In various embodiments, the colocation graph allows the online concierge system to account for distances between different regions of the online concierge system-specific portion of the warehouse, which allows the online concierge system to account for travel time between regions of the online concierge system-specific portion of the warehouse for shoppers. The colocation graph identifies each region within the online concierge system-specific portion of the warehouse and maintains connections between different pairs of regions within the online concierge system-specific portion of the warehouse. A weight of a connection between a region within the online concierge system-specific portion of the warehouse and an additional region within the online concierge system-specific portion of the warehouse is a distance between the region and the additional region. In various embodiments, the online concierge system generates and stores a colocation graph corresponding to different warehouses, allowing the online concierge system to account for different configurations of different warehouses.

The online concierge system leverages the clustering and the colocation graph to determine placement of items in regions of the online concierge system-specific portion of the warehouse. Using the clustering and the colocation graph allows the online concierge system to generate instructions for placing items in different regions of the online concierge system-specific portion of the warehouse that reduces amounts of time for shoppers to retrieve items from the warehouse when fulfilling orders. In various embodiments, the online concierge system applies one or more greedy optimization methods to combinations of pairs of items and regions within the online concierge system-specific portion of the warehouse subject to an optimization function.

In various embodiments, the optimization function accounts for distances between regions within the online concierge system-specific portion of the warehouse, co-occurrences of items, measures of similarity between items, predicted numbers of orders including items, and rates at which items have been found by shoppers. In various embodiments, the online concierge system applies a trained prediction model to numbers of orders including an item at different times to predict a number of orders including the item. The prediction model may be trained from examples comprising different time intervals labeled with numbers of orders received during a time interval including the item. In various embodiments, the prediction model is a classical time series model, while in other embodiments the prediction model is a neural network trained by backpropagation of an error term based on a loss function between a label applied to an example and a predicted number of orders through layers of the neural network until one or more conditions are satisfied. Further, a rate at which an item has been found by shoppers is based on a previously received number of orders including the item and a number of previously fulfilled orders including the item in which a shopper obtained the item. For example, the rate at which the item has been found is determined by dividing the number of previously fulfilled orders including the item in which a shopper obtained the item by the number of previously received orders including the item. In various embodiments, the rate at which an item has been found is determined for a particular time interval or determined from previously received orders including the item obtained (or fulfilled) that satisfy one or more criteria.

For a combination of an item at a region within the online concierge system-specific portion of the warehouse and an additional item at an additional region within the online concierge system-specific portion of the warehouse, the online concierge system determines a co-occurrence value as a product of a distance between the region and the additional region, the co-occurrence score of the item and the additional item, a predicted number of orders including the item, and a predicted number of orders including the additional item. The online concierge system also determines a similarity value by multiplying the measure of similarity between the item and the additional item, a predicted number of orders in which the item was found, and a predicted number of orders in which the additional item was found. In the preceding example, the online concierge system determines the optimization function for the combination by dividing the co-occurrence value by the similarity value. In various embodiments, the online concierge system applies the optimization function to each combination of pairs of items and regions within the online concierge system-specific portion of the warehouse. For example, the online concierge system selects a cluster of items, generates each pair of items of the cluster and region of the online concierge system-specific portion of the warehouse, and applies the optimization function to each combination of two pairs of items of the cluster and region of the online concierge system-specific portion of the warehouse. In embodiments where the items are hierarchically clustered, the online concierge system selects a cluster at a lowest level in the hierarchy and applies the optimization function to each combination of two pairs of regions within the online concierge system-specific region of the warehouse and an item of the cluster.

In various embodiments, the online concierge system selects combinations of pairs of items and regions within the online concierge system-specific portion of the warehouse based on the values for the combinations from the optimization function. A selected combination of pairs includes a first pair of an item and a region within the online concierge system-specific portion of the warehouse and a second pair of an additional item and an additional region within the online concierge system-specific portion of the warehouse. Hence, a selected combination corresponds to placement of an item at a region within the online concierge system-specific portion of the warehouse and of an additional item at an additional region within the online concierge system-specific portion of the warehouse. The online concierge system generates the instructions for placing items within the online concierge system-specific portion of the warehouse from the selected combinations. For example, the instructions include an item identifier and a corresponding identifier of a region within the online concierge system-specific portion of the warehouse to specify placement of an item corresponding to the item identifier at the region corresponding to the identifier of the region within the online concierge system-specific portion of the warehouse. In other embodiments, multiple items may be placed in the same system-specific portion of the warehouse.

The online concierge system transmits the instructions for placing items within regions of the online concierge system-specific portion of the warehouse to a client device or to another computing device associated with the warehouse. Based on the instructions, the warehouse places items in regions of the online concierge system-specific portion of the warehouse. As the instructions for placing items in regions of the online concierge system-specific portion of the warehouse specify physical locations of items in the online concierge system-specific portion of the warehouse, generating the instructions from the optimization function accounting for characteristics of items and of regions within the online concierge system-specific portion of the warehouse allows items to be placed in regions that limits an amount of time (or an amount of distance) for a shopper to retrieve items from the online concierge system-specific portion of the warehouse.

After transmitting instructions for placing items within regions of the online concierge system-specific portion of the warehouse, when the online concierge system receives a selection of an order by a shopper to fulfill an order at the warehouse, the online concierge system transmits instructions to a client device of the shopper for obtaining items included in the order from within the warehouse. The transmitted instructions identify an item included in the online concierge system-specific portion of the warehouse and a corresponding region of the online concierge system-specific portion of the warehouse from which the item is obtained. As the items in the online concierge system-specific portion of the warehouse are placed by the online concierge system to minimize an amount of time or a distance traveled by a shopper to retrieve the items, the shopper is able to more rapidly acquire items from the online concierge system-specific portion of the warehouse. Moreover, the shopper may be able to locate the item more easily as an item will tend to be easily distinguishable from other items next to it.

Additionally, when a shopper obtains an item from the online concierge system-specific portion of the warehouse, the shopper captures an image of the region of the online concierge system-specific portion of the warehouse from which the item was obtained via a client device. The online concierge system receives the image from the client device. The online concierge system applies one or more image processing methods to determine one or more regions of the online concierge system-specific portion of the warehouse in the image and identifies items included in the one or more regions of the online concierge system-specific portion of the warehouse in the image. As the online concierge system determined which items were placed in various regions within the online concierge system-specific portion of the warehouse, analyzing the regions of the online concierge system-specific portion of the warehouse allows the online concierge system to determine inventory levels of items placed in different regions of the online concierge system-specific portion of the warehouse. In various embodiments, the online concierge system updates a machine-learned item availability model based on inventory of items determined from the received information, allowing the online concierge system to improve accuracy of the machine-learned item availability model by providing more frequent information to the online concierge system about inventory of items within the online concierge system-specific portion of the warehouse.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
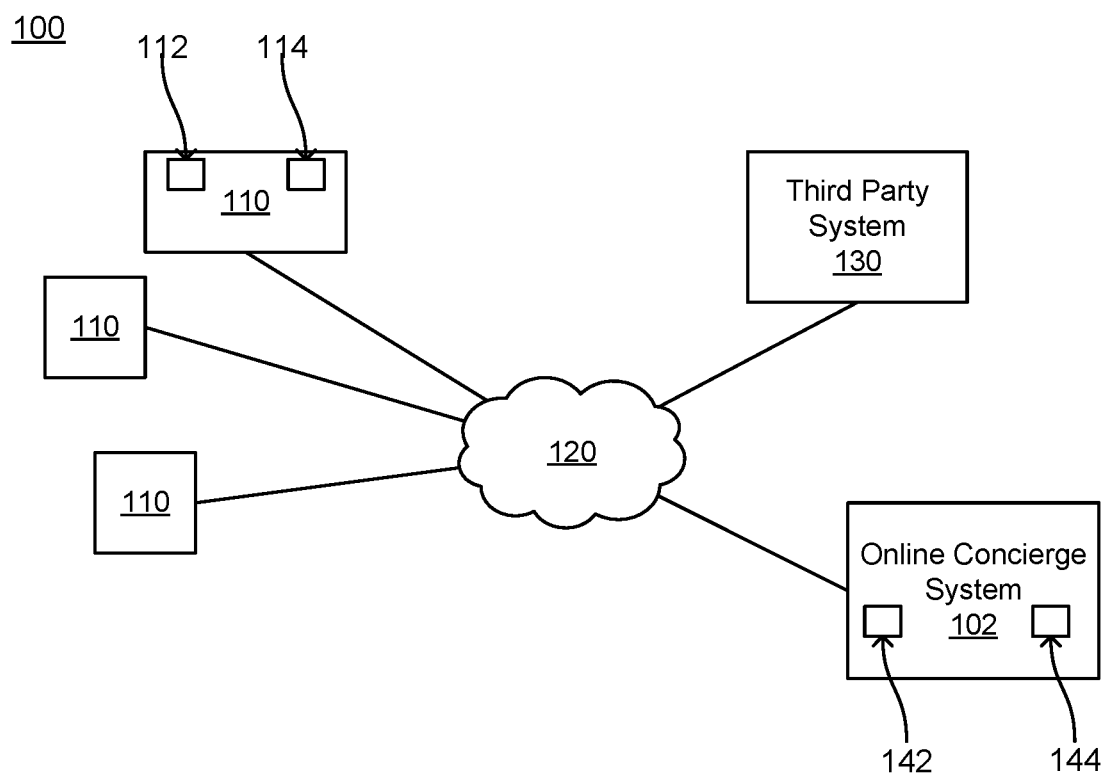
FIG. 1 is a block diagram of a system environment in which an online system, such an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2 and 5-8. For example, the memory 144 has instructions encoded thereon that, when executed by the processor 142, cause the processor 142 to generate instructions for placing items in regions of an online concierge system-specific portion of a warehouse. As further described below in conjunction with FIGS. 5-8, the online concierge system 102 accounts for measures of similarity between items, co-occurrences of items in orders, and distances between regions in the online concierge system-specific portion of the warehouse when determining placement of items in the regions of the online concierge system-specific portion of the warehouse. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-8, and may include specific computing components such as processors, memories, communication interfaces, and/or the like.

System Overview

Figure 2:
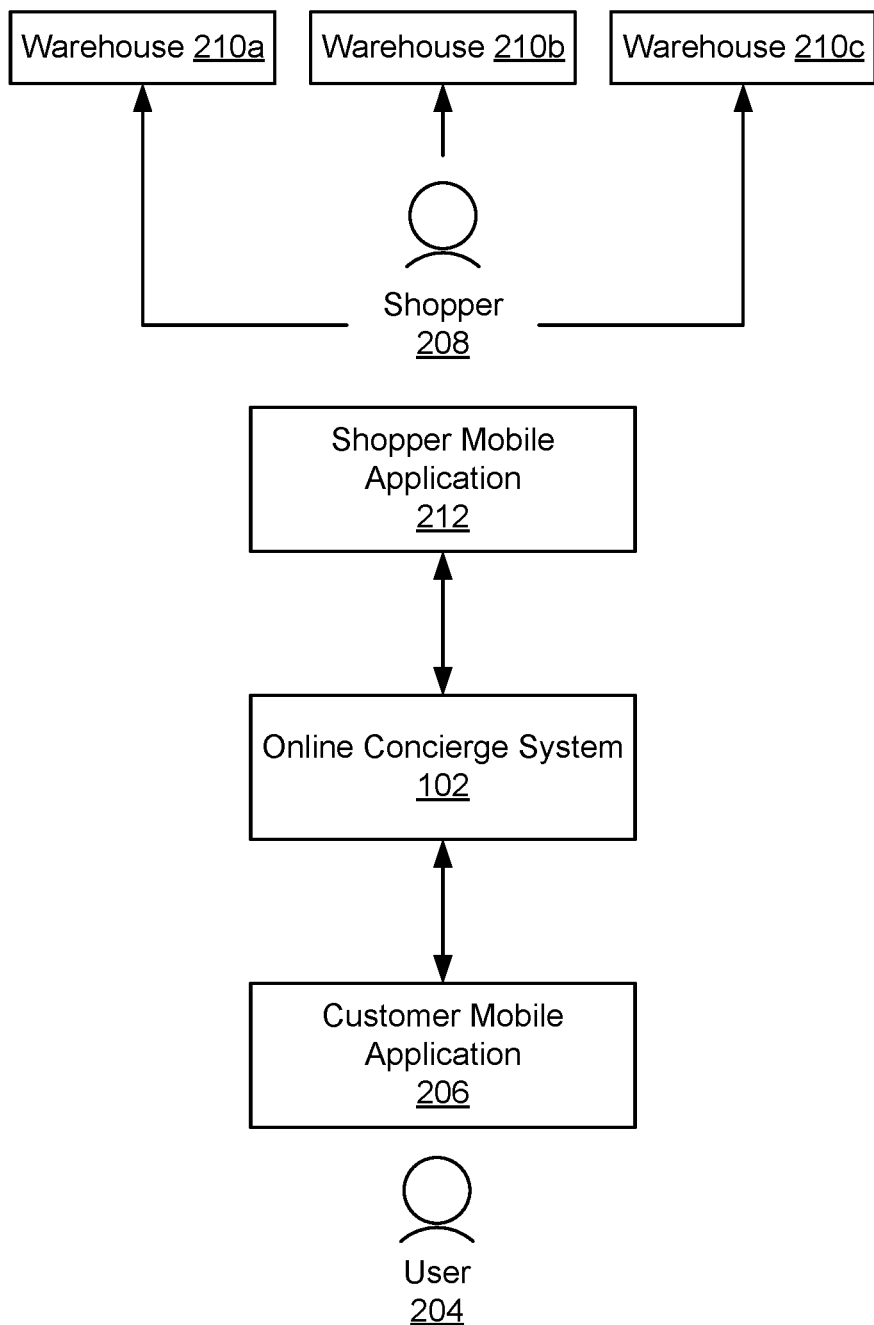
FIG. 2 illustrates an environment of an online shopping concierge service, according to one or more embodiments.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
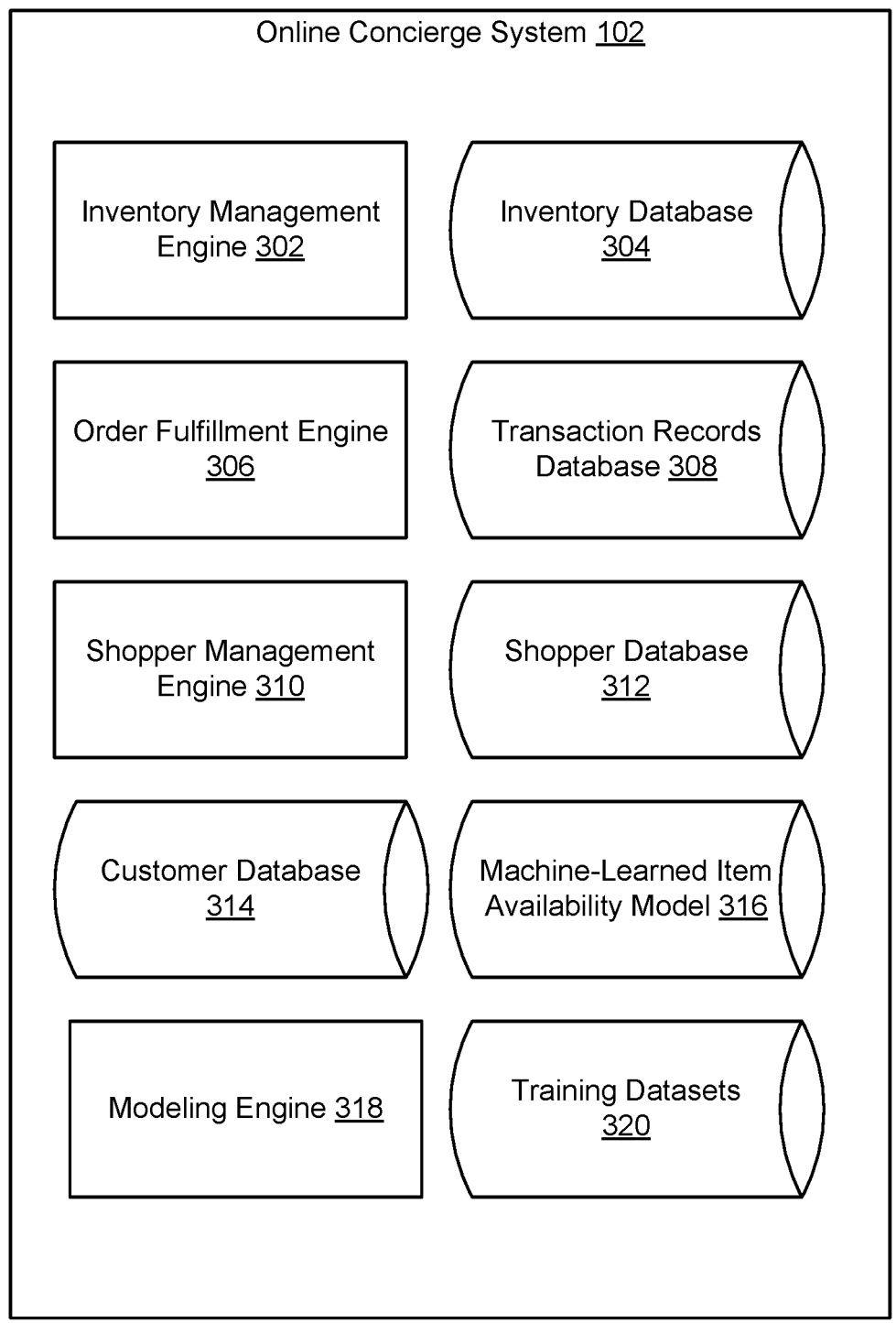
FIG. 3 is a diagram of an online shopping concierge system, according to one or more embodiments.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 202 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfilment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Additionally, the order fulfillment engine 306 includes one or more models that generate an affinity graph between items offered by a warehouse 210 based on co-occurrences of items in previously received orders. The models determine a measure of affinity between items, such as a co-occurrence score based on a number of orders including both of the items and generates an affinity graph where a connection between items has a weight of the affinity score between the items. The affinity graph is further described below in conjunction with FIGS. 5 and 6.

Additionally, the order fulfillment engine 306 generates a colocation graph describing distances between regions in an online concierge system-specific portion of a warehouse 210. As further described below in conjunction with FIG. 5, the online concierge system-specific portion of the warehouse 210 is a location within the warehouse 210 where the order fulfillment engine 306 determines placement of items in different regions. This allows the order fulfillment engine 306 to leverage information about previously fulfilled orders to place items within the online concierge system-specific portion of the warehouse 210 to reduce amounts of time for shoppers to obtain items for fulfilling orders. The colocation graph identifies different regions within the online concierge system-specific portion of the warehouse 210, with a connection between a pair of regions having a weight specifying a distance between the regions of the pair. A colocation graph is further described below in conjunction with FIGS. 5 and 7.

From the colocation graph and the affinity graph, the order fulfillment engine 306 evaluates different combinations of pairs matching items with regions within the online concierge system-specific portion of the warehouse 210. As further described below in conjunction with FIG. 5, the order fulfillment engine 306 accounts for co-occurrences of items in orders, measures of similarity between items, distances between regions within the online concierge system-specific region of the warehouse 210 and predicted numbers of orders including items when evaluating pairs of items and regions within the online concierge system-specific portion of the warehouse 210. For example, the order fulfillment engine 306 applies an optimization function to combinations of pairs of an item and a region within the online concierge system-specific portion of the warehouse 210, with the optimization function generating a value for a combination. Based on the values for different combinations, the order fulfillment engine 306 selects pairs of an item and a region within online concierge system-specific portion of the warehouse 210. From the selected pairs, the order fulfillment engine 306 generates instructions that are transmitted to the warehouse 210 for placing items in regions within the online concierge system-specific portion of the warehouse 210, as further described below in conjunction with FIGS. 5 and 8. This allows the order fulfillment engine 306 to have items placed in regions within the online concierge system-specific portion of the warehouse 210 that reduce an amount of time for shoppers to obtain items for fulfilling an order from the warehouse 210.

Machine Learning Models

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
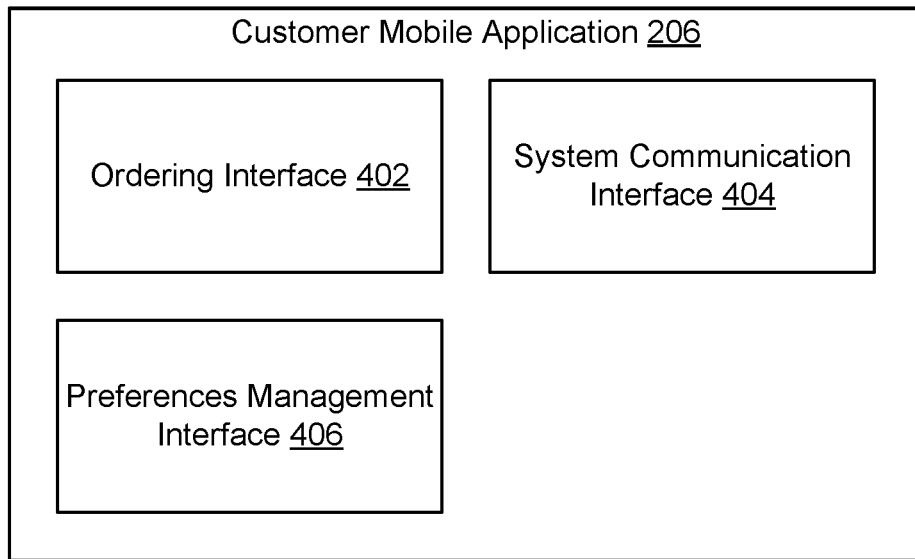
FIG. 4A is a diagram of a customer mobile application (CMA), according to one or more embodiments.

FIG. 4A is a diagram of the customer mobile application (CMA) 206, according to one embodiment. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
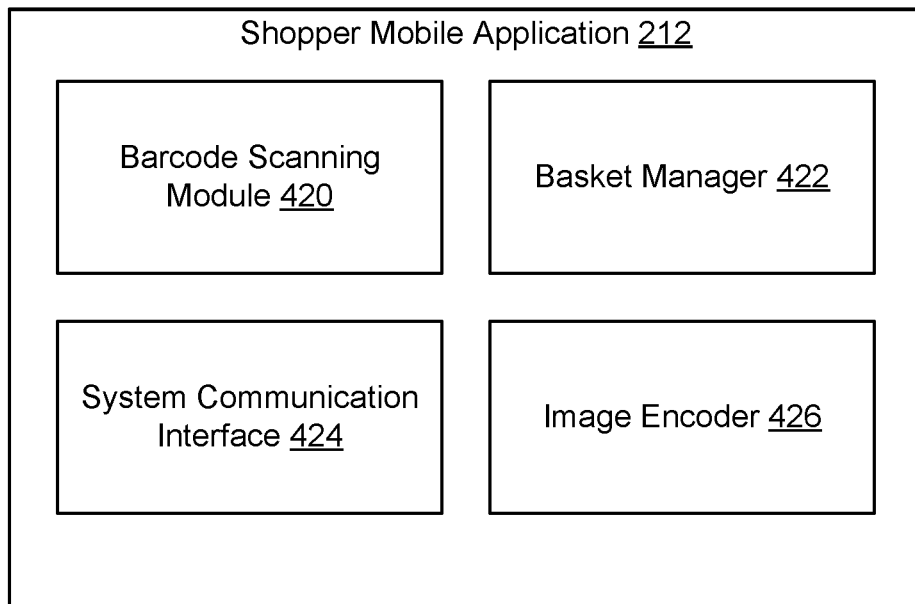
FIG. 4B is a diagram of a shopper mobile application (SMA), according to one or more embodiments.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Figure 5:
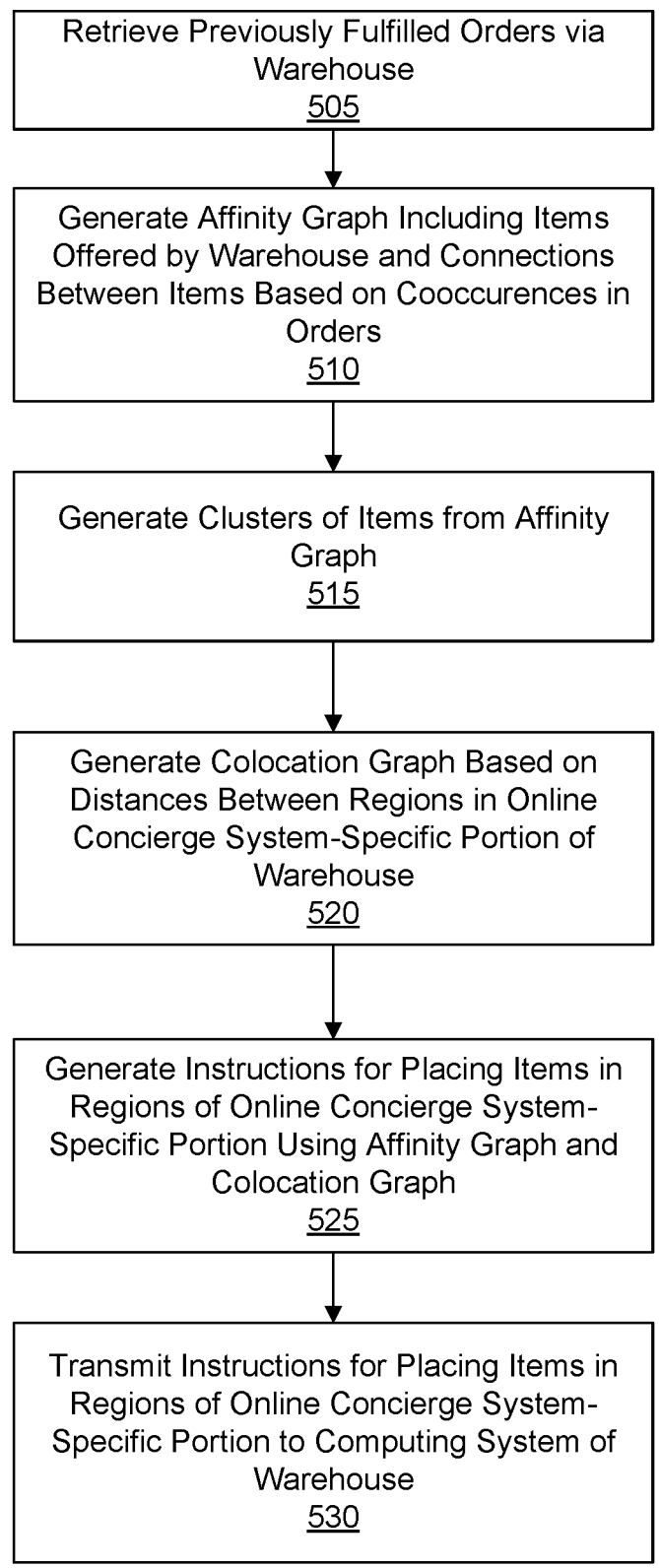
FIG. 5 is a flowchart of a method for an online concierge system arranging items in an online concierge system-specific portion of a warehouse, according to one or more embodiments.

Generating Placement of Items in Regions of a Specific Portion of a Warehouse from Prior Orders Fulfilled by an Online Concierge System FIG. 5 is a flowchart of one embodiment of a method for an online concierge system 102 arranging items in an online concierge system-specific portion of a warehouse. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments, while in other embodiments, the steps of the method are performed by any online system capable of retrieving items.

To simplify retrieval of items for orders, the online concierge system 102 and a warehouse 210 establish an online concierge system-specific portion of the warehouse 210. As further described below, the online concierge system 102 provides the warehouse 210 with instructions for arranging items within the online concierge system-specific portion of the warehouse 210. This allows the online concierge system 102 to arrange items in the online concierge system-specific portion of the warehouse 210 to reduce amounts of time for shoppers to obtain orders from the online concierge system-specific portion of the warehouse 210, decreasing fulfillment time for orders received by the online concierge system 102 that identify the warehouse 210. In various embodiments, the online concierge system-specific portion of the warehouse 210 comprises an aisle, or multiple aisles, within the warehouse 210. Further, the warehouse 210 may determine a size of the online concierge system-specific portion of the warehouse 210 as a percentage of the area within the warehouse; for example, the online concierge system-specific portion of the warehouse 210 occupies 15% or 20% of the area within the warehouse 210.

In various embodiments, the online concierge system-specific portion of the warehouse 210 is segmented into multiple regions by the online concierge system 102, with each region uniquely identified by a region identifier. For example, a region identifier includes an aisle identifier of an aisle within the online concierge system-specific portion of the warehouse 210, a row identifier specifying a row on the aisle corresponding to the aisle identifier, and a column identifier specifying a column of the aisle corresponding to the aisle identifier. However, in other embodiments, the online concierge system 102 uses other information to identify different regions within the online concierge system-specific portion of the warehouse 210.

To arrange items in regions within the online concierge system-specific portion of the warehouse 210, the online concierge system 102 retrieves 505 orders previously fulfilled by the online concierge system 102 via the warehouse 210. From the previously fulfilled orders, the online concierge system 102 generates 510 an affinity graph comprising items offered by the warehouse 210 and connections between items. In various embodiments, the online concierge system 102 selects a set of candidate items and generates 510 the affinity graph including the candidate items and connections between the candidate items. In some embodiments, the online concierge system 102 selects the set of candidate items based on predicted numbers of orders including different items. For example, the online concierge system 102 applies a trained prediction model to items offered by a warehouse 210 to determine a predicted number of orders including an item. The prediction model may be trained from examples comprising different time intervals labeled with numbers of orders received during a time interval including the item. In various embodiments, the prediction model is a classical time series model, while in other embodiments the prediction model is a neural network trained by backpropagation of an error term based on a loss function between a label applied to an example and a predicted number of orders through layers of the neural network until one or more conditions are satisfied. The online concierge system 102 may apply the trained prediction model to numbers of orders including an item during time intervals satisfying particular criteria (e.g., occurring within a threshold amount of time from a current time interval, occurring within the same month or day of the week as a current time interval, etc.).

The online concierge system 102 may account for rates, or predicted rates, at which items are found by shoppers when selecting candidate items. For example, the rate at which an item has been found is determined by dividing the number of previously fulfilled orders including the item in which a shopper obtained the item by the number of previously received orders including the item. In various embodiments, the rate at which an item has been found is determined for a particular time interval or determined from previously received orders including the item obtained (or fulfilled) that satisfy one or more criteria. In some embodiments, the online concierge system determines a rate at which an item was not found as the inverse of the rate at which the item has been found (e.g., the rate at which the item was not found is determined by subtracting the rate at which the item was found from 1) and uses the rate at which the item was not found to select the candidate items. For example, the online concierge system 102 generates a score for each item offered by the warehouse 210, with the score for an item a product of a predicted number of offers including the item and the rate at which the item was not found. The online concierge system 102 may rank the items offered by the warehouse 210 based on their scores and select the set of candidate items based on the ranking. For example, the online concierge system 102 determines a percentage of area of the warehouse 210 allocated for the online concierge system-specific portion of the warehouse 210, determines positions in the ranking corresponding to the determined percentage, and selects the set of candidate items as items in positions of the ranking corresponding to the determined positions.

The online concierge system 102 determines an affinity score between an item and an additional item based on characteristics of the item and the additional item. For example, an affinity score between the item and the additional item is based on a co-occurrence score for the item and the additional item. The co-occurrence score between an item and an additional item is based on a number of previously fulfilled orders including the item and the additional item. In an example, the online concierge system 102 determines the co-occurrence score between the item and the additional item by determining a number of previously fulfilled orders including both the item and the additional item and determining a sum of a number of items including the item and a number of items including the additional item. The co-occurrence score between the item and the additional item is determined by dividing the number of orders including both the item and the additional item by the sum. In some embodiments, the online concierge system 102 determines the co-occurrence score between the item and the additional item by multiplying the number of previously fulfilled orders including the item and including the additional item by a constant (e.g., 2) and dividing the resulting product by a sum of a number of items including the item and a number of items including the additional item. In some embodiments, the affinity score between the item and the additional item is the co-occurrence score of the item and the additional item.

The affinity score between the item and the additional item may account for other characteristics between the item and the additional item in other embodiments. For example, the online concierge system 102 determines a measure of similarity between the item and the additional item and uses the measure of similarity when determining the affinity score between the item and the additional item. In various embodiments, the online concierge system 102 determines item embeddings for each item offered by a warehouse 210, and the measure of similarity between an item and an additional item is a measure of similarity between an item embedding for the item and an additional item embedding for the additional item. Example measures of similarity between item embeddings include a cosine similarity or a dot product between the item embeddings. In other embodiments, the online concierge system 102 determines the measure of similarity between the item and the additional item based on a number of common attributes of the item and the additional item. The online concierge system 102 may determine the affinity score between the item and the additional item by combining the co-occurrence score of the item and the additional item and the measure of similarity between the item and the additional item. The affinity score between the item and the additional item is stored as a weight of a connection between the item and the additional item when generating 510 the affinity graph. In other embodiments, the online concierge system 102 stores the co-occurrence score and the measure of similarity as weights of a connection between the item and the additional item when generating 510 the affinity graph.

Figure 6:
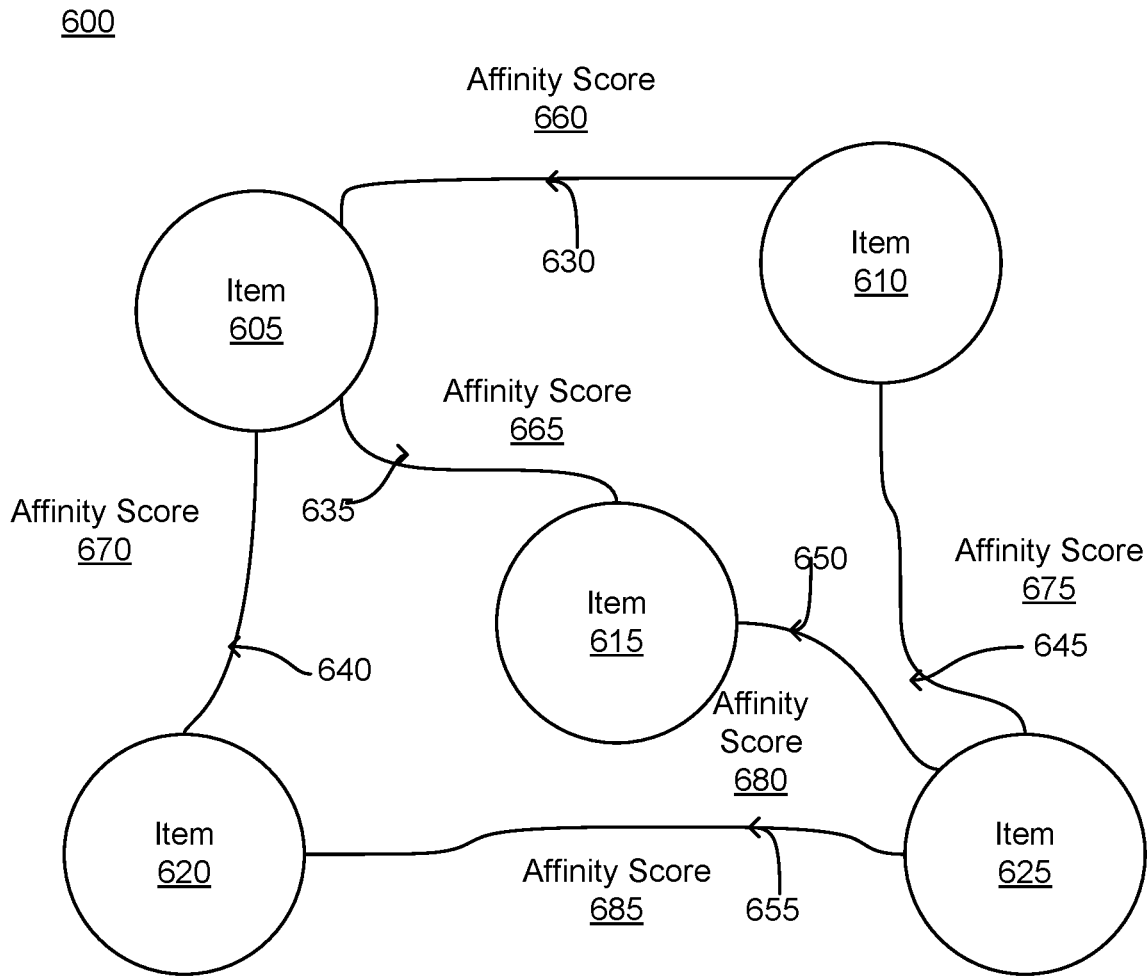
FIG. 6 shows an example affinity graph between items generated by an online concierge system, according to one or more embodiments.

FIG. 6 shows an example affinity graph 600 generated by the online concierge system 102. The example affinity graph 600 includes nodes corresponding to item 605, item 610, item 615, item 620, and item 625. As further described above in conjunction with FIG. 5, the example affinity graph 600 also includes connections between pairs of items, with each connection having an affinity score as a weight, with the affinity score based on a number of items including both items in a pair. In the example of FIG. 6, connection 630 between item 605 and item 610 has a weight of affinity score 660, which is based on a number of orders from a warehouse 210 including item 605 and item 610. Similarly, connection 635 between item 605 and item 615 has a weight of affinity score 665, based on co-occurrences of item 605 and item 615 in orders identifying the warehouse 210. Item 605 and item 620 are connected by connection 640, to which affinity score 670, determined from orders including both item 605 and item 620, is applied. Similarly, item 610 and item 625 are connected by connection 645, having a weight of affinity score 675. Connection 650 connects item 615 to item 625 with a weight of affinity score 680, while connection 655 connects item 625 and item 620 with a weight of affinity score 685.

In various embodiments, an affinity score of a connection between a first item and a second item is a co-occurrence score calculated by dividing a number of received orders including both the first item and the second item by a sum of received orders that include the first item and received orders that include the second item. However, in other embodiments, the affinity score of the connection may account for additional information. For example, the affinity score between a first item and a second item may be based on both the co-occurrence score of the first item and the second item and a measure of similarity between the first item and the second item; in the preceding example, the affinity score between the first item and the second item may be inversely related to the measure of similarity, resulting a lower measure of similarity score increasing the affinity score. In other embodiments, the connection may include multiple weights. For example, a connection between the first item and the second item includes a co-occurrence score for the first item and the second item and a measure of similarity between the first item and the second item.

Referring back to FIG. 5, the online concierge system 102 generates 515 clusters of items. In various embodiments, the online concierge system 102 uses hierarchical clustering to generate 515 the clusters of items. The online concierge system 102 generates 515 clusters so items included in a cluster have maximum co-occurrence scores with each other and minimum measures of similarity with each other in various embodiments. The online concierge system 102 generates 515 clusters of items based on distances between items, with clusters including items having less than a threshold distance between each other in the affinity graph or including items so distances between items in the cluster is minimized. To generate 515 clusters, the online concierge system 102 determines distances between pairs of items using a measure of similarity between the items of the pair and the co-occurrence score between the items of the pair. For example, the online concierge system 102 determines a distance between an item and an additional item by dividing the measure of similarity between the item and the additional item by the co-occurrence score of the item and the additional item. Using the determined distances between items, the online concierge system 102 applies one or more clustering models to generate 515 clusters. In various embodiments, using hierarchical clustering identifies a series of hierarchical groups for each item included in the affinity graph. In various embodiments, different groups of the series correspond to different levels in a taxonomy maintained by the online concierge system 102, as further described above in conjunction with FIG. 3.

While the affinity graph and the clusters of items allows the online concierge system 102 to identify relationships between items and generate 515 clusters of items with high co-occurrence scores and low measures of similarities, the online concierge system 102 also generates 520 a colocation graph describing a physical layout of the online concierge system-specific portion of the warehouse 210. In various embodiments, the colocation graph allows the online concierge system 102 to account for distances between different regions of the online concierge system-specific portion of the warehouse 210, which allows the online concierge system 102 to account for travel time between regions of the online concierge system-specific portion of the warehouse 210 for shoppers. The colocation graph identifies each region within the online concierge system-specific portion of the warehouse 210 and maintains connections between different pairs of regions within online concierge system-specific portion of the warehouse 210. A weight of a connection between a region within the online concierge system-specific portion of the warehouse 210 and an additional region within the online concierge system-specific portion of the warehouse 210 is a distance between the region and the additional region.

In various embodiments, the online concierge system 102 determines a distance between a region within the online concierge system-specific portion of the warehouse 210 and an additional region within the online concierge system-specific portion of the warehouse 210 by combining distances between different coordinates identifying the region and the additional region. For example, a region is identified by a combination of an aisle identifier, a row identifier, and a column identifier, as further described above. Similarly, an additional region is identified by a combination of an additional aisle identifier, an additional row identifier, and an additional column identifier. The online concierge system 102 determines an aisle distance between the aisle identifier and the additional aisle identifier, a row distance between the row identifier and the additional row identifier, and a column distance between the column identifier and the additional column identifier. To determine the distance between the region and the additional region, the online concierge system 102 combines the aisle distance, the row distance, and the column distance. For example, the distance between the region and the additional region is a sum of the aisle distance, the row distance, and the column distance. In other embodiments, different weights are applied to the aisle distance, to the row distance, and to the column distance, with the distance between the region and the additional region a weighted sum of the aisle distance, the row distance, and the column distance. Weights applied to the aisle distance, to the row distance, and to the column distance may be different for different warehouses 210. In some embodiments, the online concierge system stores weights for application to the aisle distance, to the row distance, and to the column distance in association with warehouse identifiers for different warehouses 210.

Figure 7:
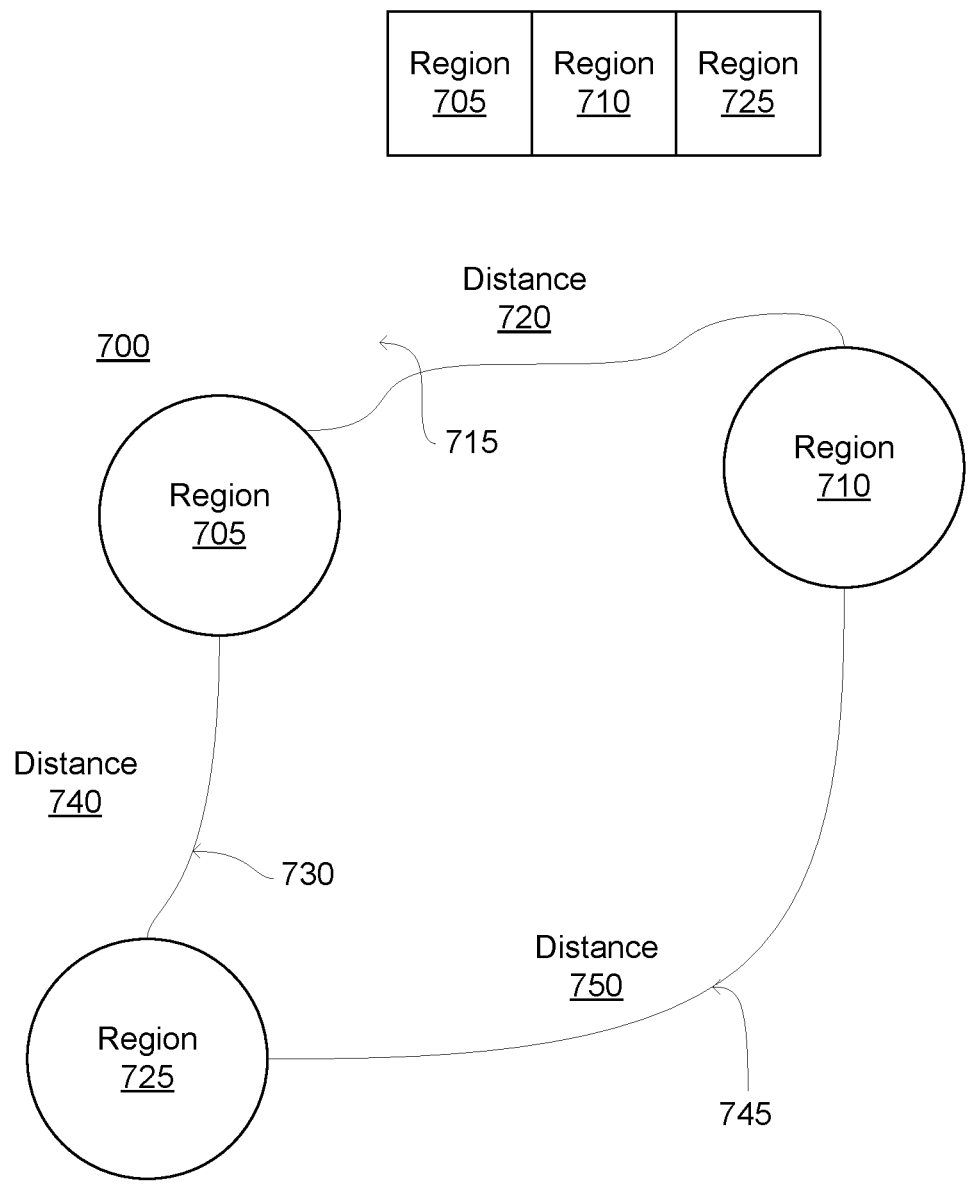
FIG. 7 is an example colocation graph identifying distances between regions of an online concierge system-specific portion of a warehouse, according to one or more embodiments.

FIG. 7 is an example colocation graph 700 generated by the online concierge system 102. For purposes of illustration, the example colocation graph 700 identifies three regions—region 705, region 710, region 725—in an online concierge system-specific portion of a warehouse 210. As further described above in conjunction with FIG. 5, the online concierge system 102 determines a distance between each pair of regions. In some embodiments, the distance between a pair of regions is determined from a combination of distances between different coordinates identifying regions within the online concierge system-specific portion of the warehouse 210.

Using the distances between different pairs of regions, the online concierge system 102 generates the example colocation graph 700. Each node in the example colocation graph 700 corresponds to a region within the online concierge system-specific region of the warehouse 210. A connection between a region and an additional region in the example colocation graph 700 has a weight specifying a distance between the region and the additional region. In the example colocation graph 700 of FIG. 7, connection 715 between region 705 and region 710 specifies distance 720 between region 705 and region 710, while connection 730 between region 705 and region 725 specifies distance 730 between region 705 and region 725. Similarly, connection 745 between region 725 and region 710 specifies distance 750 between region 725 and region 710. Hence, the example colocation graph 700 identifies distances between each pair of regions in the online concierge system-specific portion of the warehouse 210. In various embodiments, the example colocation graph 700 is stored in association with an identifier of the warehouse 210, allowing the online concierge system 102 to maintain different colocation graphs for different warehouses 210.

Referring back to FIG. 5, the online concierge system 102 leverages the affinity graph and the colocation graph to determine placement of items in regions of the online concierge system-specific portion of the warehouse 210. Using the affinity graph and the colocation graph allows the online concierge system 102 to generate 525 instructions for placing items in different regions of the online concierge system-specific portion of the warehouse 210 that reduces amounts of time for shoppers to retrieve items from the warehouse 210 when fulfilling orders. In various embodiments, the online concierge system 102 applies one or more greedy optimization methods to combinations of pairs of items and regions within the online concierge system-specific portion of the warehouse 210 subject to an optimization function. In various embodiments, the optimization function accounts for distances between regions within the online concierge system-specific portion of the warehouse 210, co-occurrences of items, measures of similarity between items, predicted numbers of orders including items, and rates at which items have been found by shoppers. In various embodiments, the online concierge system 102 applies a trained prediction model to numbers of orders including an item at different times to predict a number of orders including the item. The prediction model may be trained from examples comprising different time intervals labeled with numbers of orders received during a time interval including the item. In various embodiments, the prediction model is a classical time series model, while in other embodiments the prediction model is a neural network trained by backpropagation of an error term based on a loss function between a label applied to an example and a predicted number of orders through layers of the neural network until one or more conditions are satisfied. Further, a rate at which an item has been found by shoppers is based on a previously received number of orders including the item and a number of previously fulfilled orders including the item in which a shopper obtained the item. For example, the rate at which the item has been found is determined by dividing the number of previously fulfilled orders including the item in which a shopper obtained the item by the number of previously received orders including the item. In various embodiments, the rate at which an item has been found is determined for a particular time interval or determined from previously received orders including the item obtained (or fulfilled) that satisfy one or more criteria.

For a combination of an item at a region within online concierge system-specific portion of the warehouse 210 and an additional item at an additional region within the online concierge system-specific portion of the warehouse 210, the online concierge system 102 determines a co-occurrence value as a product of a distance between the region and the additional region, the co-occurrence score of the item and the additional item, a predicted number of orders including the item, and a predicted number of orders including the additional item. The online concierge system 102 also determines a similarity value by multiplying the measure of similarity between the item and the additional item, a predicted number of orders in which the item was found, and a predicted number of orders in which the additional item was found. In the preceding example, the online concierge system 102 determines the optimization function for the combination by dividing the co-occurrence value by the similarity value. In various embodiments, the online concierge system 102 applies the optimization function to each combination of pairs of items and regions within the online concierge system-specific portion of the warehouse 210. For example, the online concierge system 102 selects a cluster of items, generates each pair of item of the cluster and region of the online concierge system-specific portion of the warehouse 210, and applies the optimization function to each combination of two pairs of item of the cluster and region of the online concierge system-specific portion of the warehouse 210. In embodiments where the items are hierarchically clustered, the online concierge system 102 selects a cluster at a lowest level in the hierarchy and applies the optimization function to each combination of two pairs of regions within the online concierge system-specific region of the warehouse 210 and an item of the cluster, in various embodiments. Selecting a cluster to which the optimization function is applied allows the online concierge system 102 to more efficiently allocate computational resources for application of the optimization function.

The online concierge system 102 selects combinations of pairs of items and regions within the online concierge system-specific portion of the warehouse 210 based on the values for the combinations from the optimization function. A selected combination of pairs includes a first pair of an item and a region within the online concierge system-specific portion of the warehouse 210 and a second pair of an additional item and an additional region within online concierge system-specific portion of the warehouse 210. Hence, a selected combination corresponds to placement of an item at a region within the online concierge system-specific portion of the warehouse 210 and of an additional item at an additional region within the online concierge system-specific portion of the warehouse 210. The online concierge system 102 generates 525 the instructions for placing items within the online concierge system-specific portion of the warehouse 210 from the selected combinations. For example, the instructions include an item identifier and a corresponding identifier of a region within the online concierge system-specific portion of the warehouse 210 to specify placement of an item corresponding to the item identifier at the region corresponding to the identifier of the region within the online concierge system-specific portion of the warehouse 210.

Figure 8:
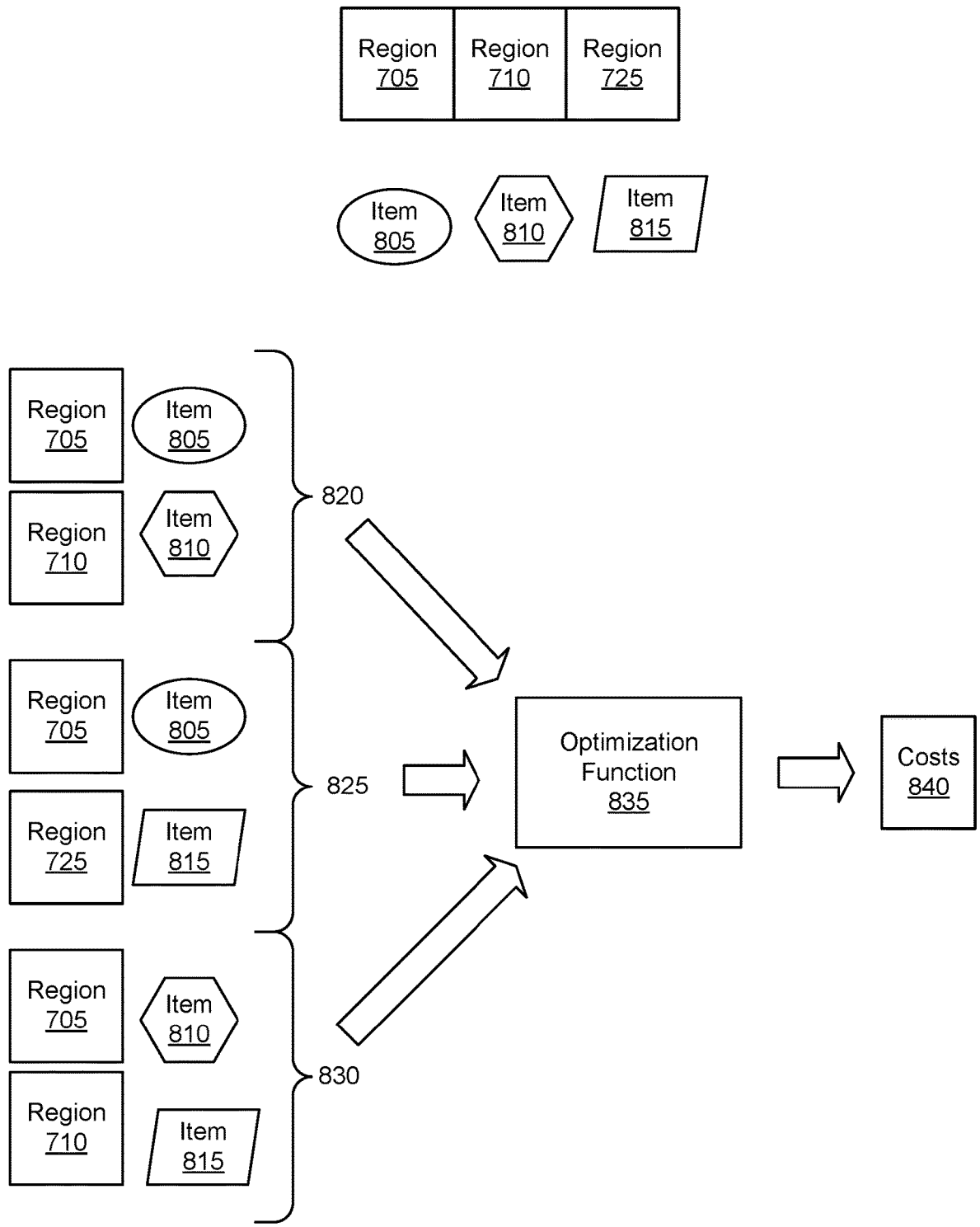
FIG. 8 is a process flow diagram of placement of items within regions of an online concierge system-specific portion of a warehouse using an optimization function, according to one or more embodiments.

FIG. 8 is a process flow diagram of one embodiment of placement of items within regions of an online concierge system-specific portion of a warehouse 210 using an optimization process. This optimization process receives as inputs a list of regions and a list of items. For purposes of illustration, FIG. 8 shows three regions—region 705, region 710, region 715—and three items—item 805, item 810, item 815. To determine placement of items in regions of the online concierge system-specific portion of the warehouse 210, the online concierge system 102 generates pairs that each include an item and a region. For purposes of illustration, FIG. 8 shows a pair including region 705 and item 805, a pair including region 710 and item 810, a pair including region 725 and item 815, a pair including region 705 and item 810, and a pair including region 710 and item 815. However, in various embodiments, the online concierge system 102 generates a pair corresponding to each combination of region and item.

The online concierge system 102 generates combinations each including two generated pairs in various embodiments. In the example of FIG. 8, combination 820 includes the pair including region 705 and item 805 and the pair including region 710 and item 810. Similarly, combination 825 in FIG. 8 includes the pair including region 705 and item 805 and the pair including region 725 and item 815. FIG. 8 also shows combination 830 including the pair including region 750 and item 810 and the pair including region 710 and item 815. In various embodiments, the online concierge system 102 generates a combination corresponding to each grouping of two generated pairs.

The online concierge system 102 applies an optimization function 835 to each of combination 820, combination 825, and combination 830. The optimization function 835 outputs a cost 840 (or score) for each of the combinations 820, 825, 830. As further described above in conjunction with FIG. 5, the optimization function 835 accounts for distances between regions within the online concierge system-specific portion of the warehouse 210, co-occurrences of items, measures of similarity between items, predicted numbers of orders including items, and rates at which items have been found by shoppers. Application of the optimization function 835 to a combination results in a value for a combination. In the embodiment shown by FIG. 8, the online concierge system 102 ranks the combinations based on their corresponding scores 840 from the optimization function 835, thereby providing a ranking of combination 830, combination 820, and combination 825. The online concierge system 102 selects one or more combinations based on the ranking and generates instructions for placing items in regions of the online concierge system-specific portion of the warehouse 210 based on the pairs of item and region in the selected one or more combinations.

Referring back to FIG. 5, the online concierge system 102 transmits 530 the instructions for placing items within regions of online concierge system-specific portion of the warehouse 210 to a client device 110 or to another computing device associated with the warehouse 210. Based on the instructions, the warehouse 210 places items in regions of the online concierge system-specific portion of the warehouse 210. As the instructions for placing items in regions of the online concierge system-specific portion of the warehouse 210 specify physical locations of items in the online concierge system-specific portion of the warehouse 210, generating 525 the instructions from the optimization function accounting for characteristics of items and of regions within the online concierge system-specific portion of the warehouse 210 allows items to be placed in regions that limits an amount of time (or an amount of distance) for a shopper to retrieve items from the online concierge system-specific portion of the warehouse 210.

After transmitting 530 instructions for placing items within regions of the online concierge system-specific portion of the warehouse 210, when the online concierge system 102 receives a selection of an order by a shopper to fulfill an order at the warehouse 210, the online concierge system 102 transmits instructions to a client device 110 of the shopper for obtaining items included in the order from within the warehouse 210. The transmitted instructions identify an item included in the online concierge system-specific portion of the warehouse 210 and a corresponding region of the online concierge system-specific portion of the warehouse 210 from which the item is obtained. As the items in the online concierge system-specific portion of the warehouse 210 are placed by the online concierge system 102 to minimize an amount of time or a distance traveled by a shopper to retrieve the items, the shopper is able to more rapidly acquire items from the online concierge system-specific portion of the warehouse 210.

Additionally, when a shopper obtains an item from the online concierge system-specific portion of the warehouse 210, the shopper captures an image of the region of the online concierge system-specific portion of the warehouse 210 from which the item was obtained via a client device 110. The online concierge system 102 receives the image from the client device 110. The online concierge system 102 applies one or more image processing methods to determine one or more regions of the online concierge system-specific portion of the warehouse 210 in the image and identifies items included in the one or more regions of the online concierge system-specific portion of the warehouse 210 in the image. As the online concierge system 102 determined which items were placed in various regions within the online concierge system-specific portion of the warehouse 210, analyzing the regions of the online concierge system-specific portion of the warehouse 210 allows the online concierge system 102 to determine inventory levels of items placed in different regions of the online concierge system-specific portion of the warehouse 210. In various embodiments, the online concierge system 102 updates the machine-learned item availability model 316 based on inventory of items determined from the received information, allowing the online concierge system 102 to improve accuracy of the machine-learned item availability model 316 by providing more frequent information to the online concierge system 102 about inventory of items within the online concierge system-specific portion of the warehouse 210. For example, the online concierge system 102 generates an example including an item corresponding to a region within the online concierge-system specific portion of the warehouse 210 including an identifier of the item and information about the warehouse 210 and applies a label to the example indicating whether the item was available at the warehouse 210 based on the image. The online concierge system 102 applies the machine-learned item availability model 316 to the example and generates an error term by applying a loss function to a difference between the label applied to the example and a predicted availability output by the machine-learned item availability model 316. The online concierge system 102 backpropagates the error term through the machine-learned item availability model 316 to modify one or more parameters of the machine-learned item availability model 316.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method, performed by a computing system comprising a processor and a computer-readable medium, comprising:
generating an affinity graph including nodes representing items offered by a warehouse and connections between pairs of items offered by the warehouse, wherein a connection between a pair of items represents co-occurrences of items of the pair occurring in previously received orders identifying the warehouse;
generating a colocation graph for the warehouse, the colocation graph including different regions within the warehouse, wherein the colocation graph includes connections between pairs of regions within the warehouse, and wherein the connections represent distances between regions within the warehouse;

generating instructions for placing items in regions within the warehouse by applying an optimization function to a plurality of combinations of pairs, wherein each combination of the plurality of combinations of pairs comprises a first pair including information specifying a first item and a first region within the warehouse and a second pair including information specifying a second item and a second region within the warehouse, and wherein the optimization function is a function based on a connection between the first region and the second region within the colocation graph and a connection between the first item and the second item in the affinity graph; and transmitting the instructions for placing items in regions within the warehouse to a computing system associated with the warehouse.

2. The method of claim 1, wherein generating the affinity graph comprises:
determining the connection between the pair of items based on a weight of a co-occurrence score calculated based on co-occurrences of items of the pair in previously received orders identifying the warehouse.

3. The method of claim 2, wherein generating the affinity graph comprises:
determining the co-occurrence score by computing a sum of previously fulfilled orders including one item of the pair of items and previously fulfilled orders including a different item of the pair and dividing a product of a constant and a number of previously fulfilled orders including both items of the pair by the sum.

4. The method of claim 1, wherein the optimization function is a function based on a measure of similarity between a first item embedding for the first item and a second item embedding for the second item.

5. The method of claim 1, wherein generating the affinity graph including items offered by the warehouse comprises:
generating clusters of items offered by the warehouse based on distances between items in the affinity graph, wherein a distance between each pair of items in the affinity graph is based on a number of co-occurrences of the pair of items in the previously received orders identifying the warehouse and a measure of similarity between the pair of items.

6. The method of claim 5, further comprising:
determining the distance between each pair of items in the affinity graph by dividing the measure of similarity between the pair of items by a co-occurrence score of the pair of items, the co-occurrence score based on a number of the previously received orders identifying the warehouse including both of the pair of items.

7. The method of claim 5, wherein the combination of pairs includes each pair of items in a specific cluster and regions within the warehouse.

8. The method of claim 1, wherein applying the optimization function comprises:
determining a co-occurrence value as a product of a distance between the first region and the second region, a co-occurrence score of the first item and the second item based on a number of co-occurrences of the first item and the second item in the previously received orders, a predicted number of orders including the first item, and a predicted number of orders including the second item;
determining a similarity value by multiplying a measure of similarity between the first item and the second item, a predicted number of orders in which the first item is found, and a predicted number of orders in which the second item is found; and
determining a value for the combination by dividing the co-occurrence value by the similarity value.

9. The method of claim 1, wherein generating instructions for placing items in regions within the warehouse comprises:
ranking combinations including pairs of items and regions within the warehouse based on corresponding values from application of the optimization function to the combinations of pairs;
selecting combinations having at least a threshold position in the ranking; and
generating the instructions specifying placement of items in regions within the warehouse according to the selected combinations.

10. A non-transitory computer-readable medium storing instructions that, when executed by a processor, cause the processor to perform operations comprising:
generating an affinity graph including nodes representing items offered by a warehouse and connections between pairs of items offered by the warehouse, wherein a connection between a pair of items represents co-occurrences of items of the pair occurring in previously received orders identifying the warehouse;
generating a colocation graph for the warehouse, the colocation graph including different regions within the warehouse, wherein the colocation graph includes connections between pairs of regions within the warehouse, and wherein the connections represent distances between regions within the warehouse;
generating instructions for placing items in regions within the warehouse by applying an optimization function to a plurality of combinations of pairs, wherein each combination of the plurality of combinations of pairs comprises a first pair including information specifying a first item and a first region within the warehouse and a second pair including information specifying a second item and a second region within the warehouse, and wherein the optimization function is a function based on a connection between the first region and the second region within the colocation graph and a connection between the first item and the second item in the affinity graph; and
transmitting the instructions for placing items in regions within the warehouse to a computing system associated with the warehouse.

11. The computer-readable medium of claim 10, wherein generating the affinity graph comprises:
determining the connection between the pair of items based on a weight of a co-occurrence score calculated based on co-occurrences of items of the pair in previously received orders identifying the warehouse.

12. The computer-readable medium of claim 11, wherein generating the affinity graph comprises:
determining the co-occurrence score by computing a sum of previously fulfilled orders including one item of the pair of items and previously fulfilled orders including a different item of the pair and dividing a product of a constant and a number of previously fulfilled orders including both items of the pair by the sum.

13. The computer-readable medium of claim 10, wherein the optimization function is a function based on a measure of similarity between a first item embedding for the first item and a second item embedding for the second item.

14. The computer-readable medium of claim 10, wherein generating, the affinity graph including items offered by the warehouse comprises:
  generating clusters of items offered by the warehouse based on distances between items in the affinity graph, wherein a distance between each pair of items in the affinity graph is based on a number of co-occurrences of the pair of items in the previously received orders identifying the warehouse and a measure of similarity between the pair of items.

15. The computer-readable medium of claim 14, the operations further comprising:
  determining the distance between each pair of items in the affinity graph by dividing the measure of similarity between the pair of items by a co-occurrence score of the pair of items, the co-occurrence score based on a number of the previously received orders identifying the warehouse including both of the pair of items.

16. The computer-readable medium of claim 14, wherein the combination of pairs includes each pair of items in a specific cluster and regions within the warehouse.

17. The computer-readable medium of claim 10, wherein applying the optimization function comprises:
  determining a co-occurrence value as a product of a distance between the first region and the second region, a co-occurrence score of the first item and the second item based on a number of co-occurrences of the first item and the second item in the previously received orders, a predicted number of orders including the first item, and a predicted number of orders including the second item;
  determining a similarity value by multiplying a measure of similarity between the first item and the second item, a predicted number of orders in which the first item is found, and a predicted number of orders in which the second item is found; and
  determining a value for the combination by dividing the co-occurrence value by the similarity value.

18. The computer-readable medium of claim 10, wherein generating instructions for placing items in regions within the warehouse comprises:
  ranking combinations including pairs of items and regions within the warehouse based on corresponding values from application of the optimization function to the combinations of pairs;
  selecting combinations having at least a threshold position in the ranking; and
  generating the instructions specifying placement of items in regions within the warehouse according to the selected combinations.

19. A system comprising:
  a processor; and
  a non-transitory computer-readable medium storing instructions that, when executed by the processor, cause the processor to perform operations comprising:
    generating an affinity graph including nodes representing items offered by a warehouse and connections between pairs of items offered by the warehouse, wherein a connection between a pair of items represents co-occurrences of items of the pair occurring in previously received orders identifying the warehouse;
    generating a colocation graph for the warehouse, the colocation graph including different regions within the warehouse, wherein the colocation graph includes connections between pairs of regions within the warehouse, and wherein the connections represent distances between regions within the warehouse;
    generating instructions for placing items in regions within the warehouse by applying an optimization function to a plurality of combinations of pairs, wherein each combination of the plurality of combinations of pairs comprises a first pair including information specifying a first item and a first region within the warehouse and a second pair including information specifying a second item and a second region within the warehouse, and wherein the optimization function is a function based on a connection between the first region and the second region within the colocation graph and a connection between the first item and the second item in the affinity graph; and
    transmitting the instructions for placing items in regions within the warehouse to a computing system associated with the warehouse.

20. The system of claim 19, wherein generating the affinity graph comprises:
  determining the connection between the pair of items based on a weight of a co-occurrence score calculated based on co-occurrences of items of the pair in previously received orders identifying the warehouse.

* * * * *